(12) United States Patent
Yamazaki

(10) Patent No.: US 10,901,306 B2
(45) Date of Patent: Jan. 26, 2021

(54) OPTICAL ELEMENT UNIT AND OPTICAL APPARATUS

(71) Applicant: CANON KABUSHIKI KAISHA, Tokyo (JP)

(72) Inventor: Toshinori Yamazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/549,311

(22) Filed: Aug. 23, 2019

(65) Prior Publication Data

US 2020/0073214 A1    Mar. 5, 2020

(30) Foreign Application Priority Data

Sep. 4, 2018 (JP) ................ 2018-165240
Aug. 7, 2019 (JP) ................ 2019-145192

(51) Int. Cl.
*G03B 17/56* (2006.01)
*G02B 7/00* (2006.01)

(52) U.S. Cl.
CPC .......... *G03B 17/565* (2013.01); *G02B 7/006* (2013.01)

(58) Field of Classification Search
USPC ........................................................ 396/544
See application file for complete search history.

(56) References Cited

U.S. PATENT DOCUMENTS

| | | | | |
|---|---|---|---|---|
| 3,882,517 A | * | 5/1975 | Land | G03B 17/12 396/198 |
| 3,994,008 A | * | 11/1976 | Land | G03B 11/00 396/544 |
| 4,007,471 A | * | 2/1977 | Land | G03B 17/12 396/544 |
| 4,137,540 A | * | 1/1979 | Curtis | G03B 17/12 359/611 |

(Continued)

FOREIGN PATENT DOCUMENTS

| CN | 102902138 A | 1/2013 |
|---|---|---|
| CN | 205880467 U | 1/2017 |

(Continued)

OTHER PUBLICATIONS

Office Action issued in Japanese Appln. No. 2019-145192 dated Nov. 26, 2019. English translation provided.

(Continued)

*Primary Examiner* — Rodney E Fuller
(74) *Attorney, Agent, or Firm* — Rossi, Kimms & McDowell LLP

(57) ABSTRACT

An optical element unit is insertable into and removable from an opening portion provided in an optical apparatus and a first portion with a first inner diameter and a second portion with a second inner diameter smaller than the first inner diameter are disposed inside of the opening portion. The optical element unit has a third portion with a first outer diameter and a fourth portion with a second outer diameter smaller than the first outer diameter, wherein the first outer (Continued)

diameter is greater than the second inner diameter. Therefore, when the optical element unit is inserted into the opening portion in a reverse way, the third portion contacts with the second portion so that the optical element cannot be fully inserted into the opening portion.

33 Claims, 13 Drawing Sheets

(56) References Cited

U.S. PATENT DOCUMENTS

| | | | | |
|---|---|---|---|---|
| 4,383,735 A * | 5/1983 | Stravitz | ............... | G03B 11/00 |
| | | | | 359/892 |
| 4,901,098 A * | 2/1990 | Salles | ................ | G03B 11/00 |
| | | | | 396/544 |

FOREIGN PATENT DOCUMENTS

| | | | |
|---|---|---|---|
| JP | S63306431 A | | 12/1988 |
| JP | 2000089298 A | | 3/2000 |
| JP | 2005301173 A | | 10/2005 |
| JP | 2011141312 A | * | 7/2011 |
| JP | 5573164 B2 | | 8/2014 |
| JP | 2015121699 A | | 7/2015 |
| JP | 2018031956 A | | 3/2018 |
| JP | 2018045120 A | | 3/2018 |

OTHER PUBLICATIONS

Office Action issued in Chinese Appln. No. 2019108110093 dated Nov. 24, 2020 English translation provided.

* cited by examiner

OPTICAL ELEMENT UNIT AND OPTICAL APPARATUS

BACKGROUND OF THE INVENTION

Field of the Invention

The present invention relates to an optical element unit and an optical apparatus.

Description of the Related Art

A lens barrel (a lens apparatus) in which a camera accessory such as an interchangeable lens has an opening portion and a filter unit for changing the amount of light to an image sensor can be inserted onto and removed from an optical path through the opening portion is known in the related art. Japanese Patent No. 5573164 and Japanese Patent Laid-Open No. 2018-31956 disclose such related art. The filter unit is provided with an operating dial, such that an optical element provided in the filter unit can be rotated from outside by rotating the operating dial.

However, in the related art disclosed in the above Japanese Patent No. 5573164 and Japanese Patent Laid-Open No. 2018-31956, there is not any disclosure relating to how to prevent the filter unit from being inserted to the camera accessory in a reverse way. Here, if the filter unit can be properly inserted into the opening portion of the camera accessory only when a first surface of the filter unit is facing toward an object, inserting the filter unit to the camera accessory with the first surface facing toward opposite side corresponds to the "reverse way". If it is possible to insert the filter unit in the reverse way, for example, a scale indicating a transparency rate printed on an operation dial of the filter unit cannot be viewable or filter effect may be reversed.

SUMMARY OF THE INVENTION

An aspect of the present invention is to provide an optical element unit that is advantageous in terms of preventing the optical element from being mounted to an optical apparatus in the reverse way.

An optical element unit according to an aspect of the present invention to achieve the above object is configured to be insertable into and removable from an opening portion which is provided in an optical apparatus and which has a first portion with a first inner diameter and a second portion with a second inner diameter smaller than the first inner diameter, wherein the optical element unit comprising:

a first optical element;

a holding member for holding the first optical member;

wherein the holding member includes, a third portion with a first outer diameter; and a fourth portion with a second outer diameter smaller than the first outer diameter, wherein the first outer diameter is greater than the second inner diameter, wherein when the optical element unit is inserted into the opening portion with a first surface of the first optical element facing toward a first direction, the third portion confronts the first portion, while in a case where the optical element unit is inserted into the opening portion with the first surface of the first optical element facing toward a second direction opposite to the first direction, the third portion contacts with the second portion.

Further features of the present invention will become apparent from the following description of exemplary embodiments with reference to the attached drawings.

DESCRIPTION OF THE EMBODIMENTS

First Embodiment

Figure 1:
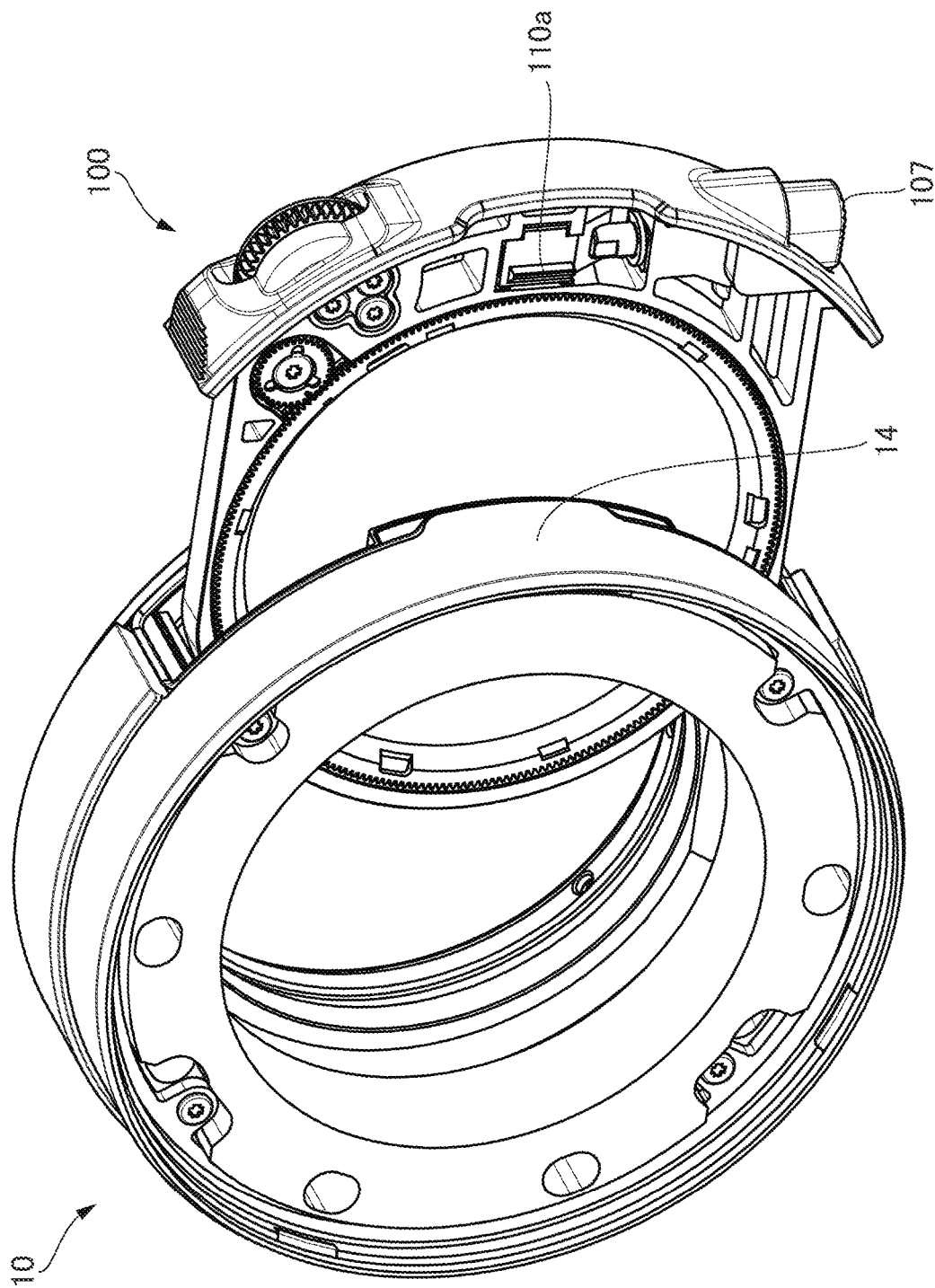
FIG. 1 is a perspective view showing a part of a lens barrel as an optical apparatus according to a first embodiment.

Hereinafter, a lens apparatus (a lens barrel 10) as an optical apparatus according to a first embodiment of the present invention will be described with reference to FIGS. 1 to 9. In the drawings, the same members and elements are denoted by the same reference numerals and redundant descriptions will be omitted.

A configuration of the lens barrel 10 of the first embodiment will be described with reference to FIG. 1. FIG. 1 is a perspective view showing a part of the lens apparatus as an optical apparatus according to the first embodiment. This figure shows a part of the lens barrel 10 as viewed from the object side. In the first embodiment, the lens barrel 10 which is detachably attached to a camera body having an image sensor will be described as an example of the optical apparatus.

The term "image plane" in the first embodiment refers to an image plane of the image sensor provided in the camera body to which the lens barrel 10 is attached. The lens barrel 10 according to the first embodiment has an opening portion that will be described later, through which a filter unit 100 (an optical element unit) can be inserted onto and removed from the optical path.

Figure 2:
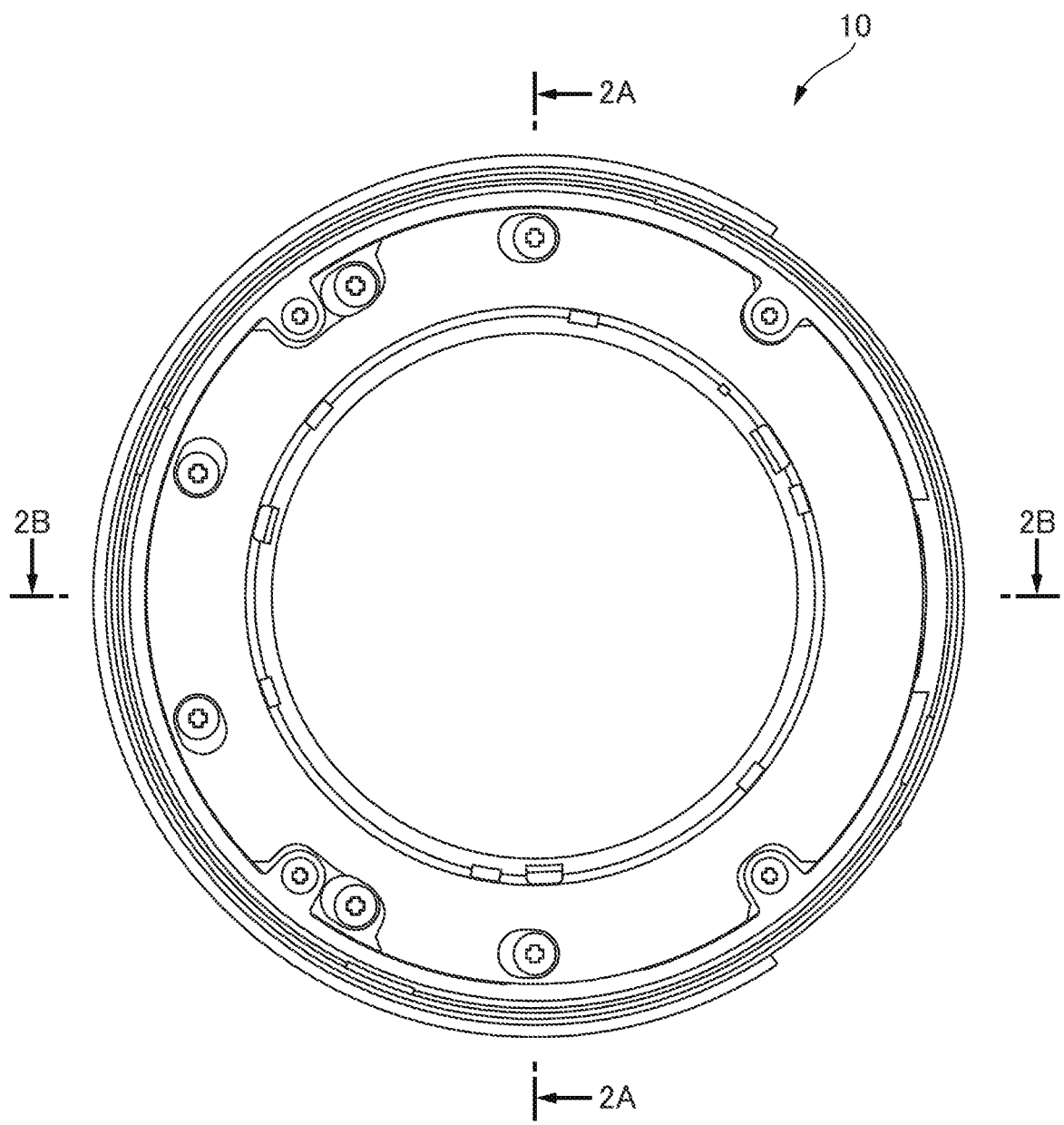
FIG. 2 is a view of a part of the optical apparatus according to the first embodiment as viewed from an object side.
Figure 3A:
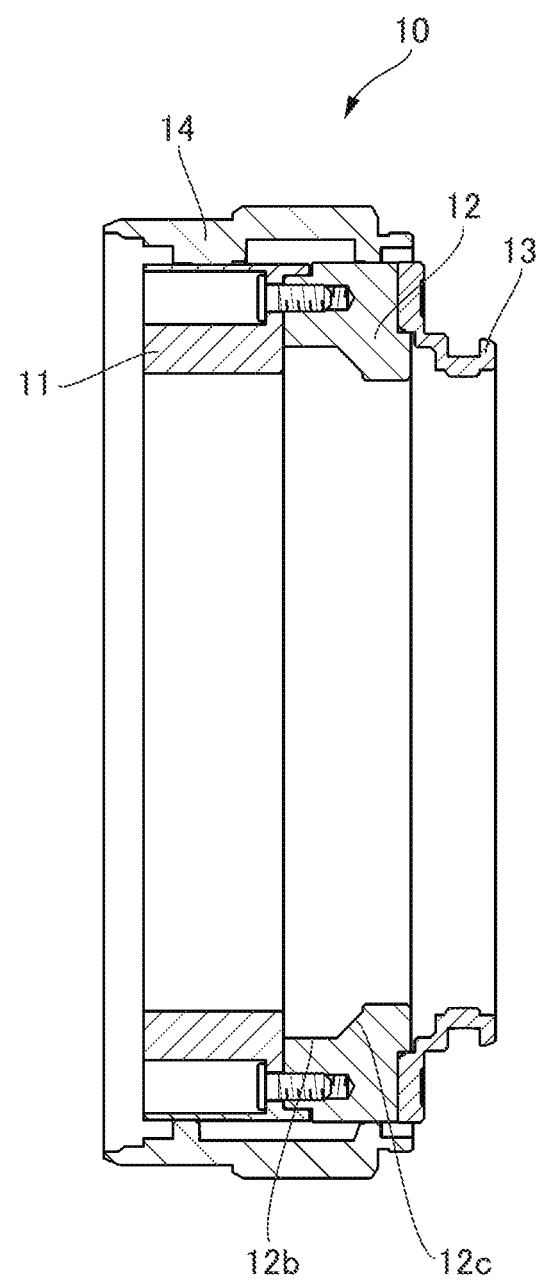
FIGS. 3A and 3B are cross-sectional views of parts of the optical apparatus according to the first embodiment.
Figure 3B:
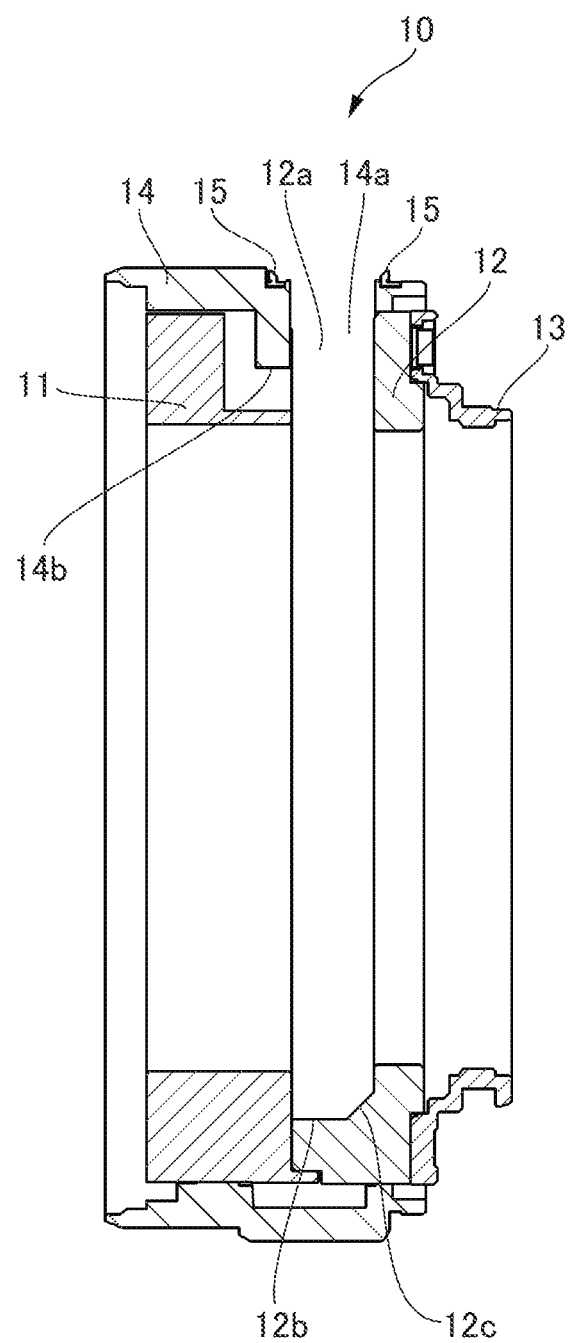

The configuration of the lens barrel 10 according to the first embodiment will be described with reference to FIGS. 2 and 3. FIG. 2 is a view of a part of the lens barrel 10 according to the first embodiment as viewed from the object side. FIGS. 3A and 3B are cross-sectional views of parts of the lens barrel 10 according to the first embodiment. FIG. 3A is a cross-sectional view taken along line 2A-2A of FIG. 2. FIG. 3B is a cross-sectional view taken along line 2B-2B of FIG. 2. The lens barrel 10 includes a first lens barrel 11, a second lens barrel 12, a mount 13, an outer ring 14, and a seal member 15. FIGS. 3A and 3B show the lens barrel 10 from which the filter unit 100 has been removed.

The first lens barrel 11, the second lens barrel 12 and the mount 13 are fixed by screws or the like to be integrated. An outer ring 14 is put on the outer periphery of the integrated unit, and the outer ring 14 and the integrated unit are fixed by screws or the like. An opening portion 12a is provided in a side surface between the first lens barrel 11 and the second lens barrel 12. A first inner surface portion 12b (a first portion) with a first inner diameter and a second inner surface portion 12c (a second portion) with a second inner diameter are formed on an inner surface of the second lens barrel 12 in the opening portion 12a. In the embodiment, the direction in which the optical axis of the lens barrel 10 extends is assumed as the optical axis direction.

In this connection, edges of narrow sides of the opening portion 12a are configured to be linear as partly shown in FIG. 1, so that the filter unit 100 (an optical element unit) can be partly inserted from the opening portion even with the first surface of the optical element unit facing toward the image plane. Therefore, even if the filter unit 100 is partly inserted in the reverse way, edges of the narrow sides of the opening portion 12a will not be damaged.

Here, the inner diameter means a distance from an optical axis to the inner surface in a plane vertical to the optical axis.

In this connection, all of the first inner surface portion 12b or all of the second inner surface portion 12c does not need to have constant inner diameter. In this embodiment, it is so configured that the first inner surface portion 12b has a first inner diameter and the second inner surface portion 12c has a second inner diameter at least in a plane (first cross-section plane) vertical to the optical axis.

An optical axis of the filter unit 100 means an optical axis of the optical filters included in the filter unit 100, and the optical axis of the filter unit 100 coincides with an optical axis of the lens barrel 10 when the filter unit 100 is fully inserted into the lens barrel 10 in a proper direction.

The second inner surface portion 12c has a smaller inner diameter than the first inner surface portion 12b and is formed closer to the image plane, that is, closer to the mount 13, than the first inner surface portion 12b is. The outer ring 14 has an opening portion 14a with an opening shape corresponding to the opening portion 12a. A lock piece end 14b is formed on a side surface of the opening portion 14a. The seal member 15 is provided on the outer periphery of the opening portion 14a provided in the outer ring 14. A method of fixing the seal member 15 may include a known method such as via an adhesive or double-sided tape. The seal member 15 may be made of, for example, a waterproof material such as silicone rubber.

Figure 4:
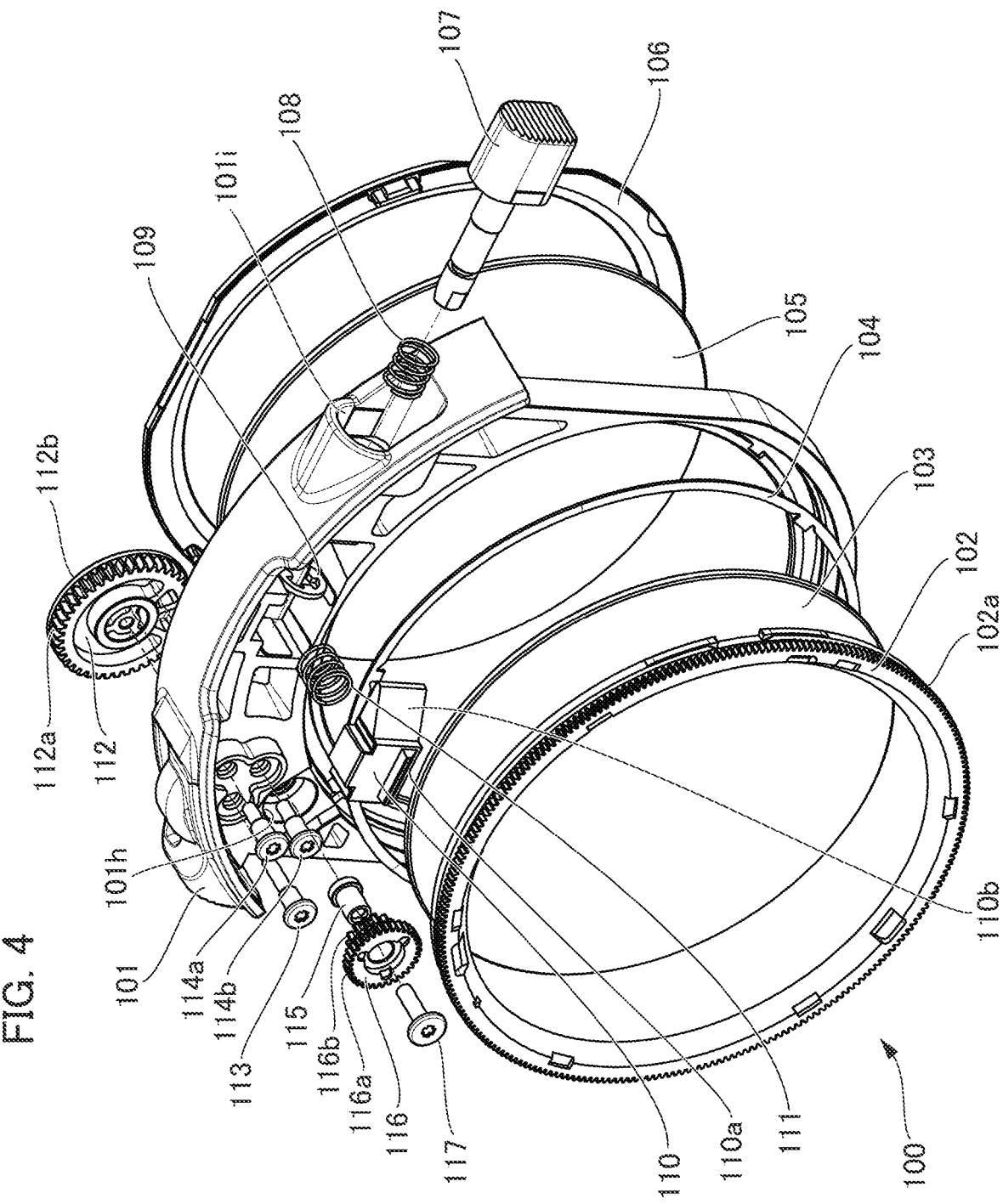
FIG. 4 is a perspective view of a filter unit.

A configuration of the filter unit 100 according to the first embodiment will be described with reference to FIGS. 4, 5 and 6. FIG. 4 is a perspective view of the filter unit 100. The filter unit 100 includes a filter holder 101, a filter frame 102, a first filter 103 (a first optical element), a plate spring 104, a second filter 105 (a second optical element), a decorative plate 106, a release button 107, a release spring 108, and a retaining ring 109. Here the filter holder 101 and the filter frame 102 together function as a holding member for holding the first filter 103. The filter unit 100 further includes a lock piece 110, a lock spring 111, an operating dial 112 (an operating member), an operating dial shaft 113, an operating dial end shaft 114a, and an operating dial end shaft 114b.

Furthermore, the filter unit 100 includes a spacer 115, a connection gear 116 (a connection member), and a connection gear stop screw 117.

Figure 5:
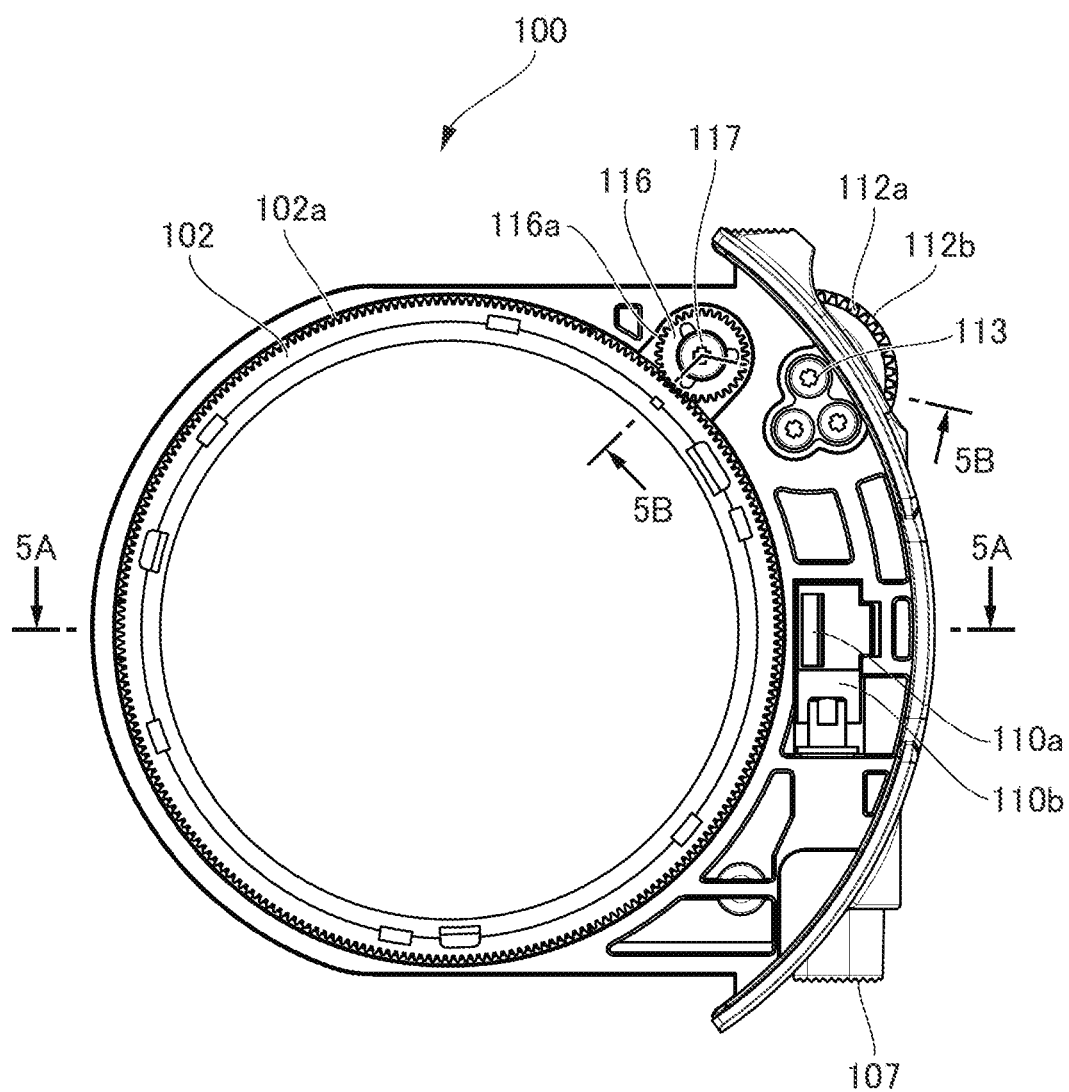
FIG. 5 is a view of a filter unit according to the first embodiment as viewed from the object side.
Figure 6A:
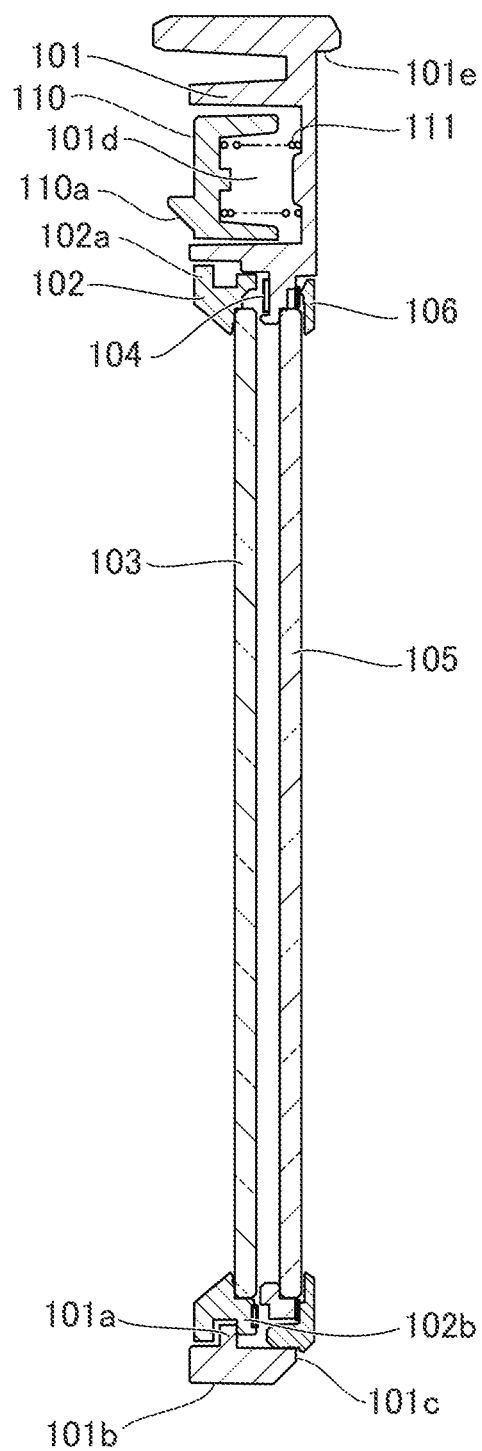
FIGS. 6A and 6B are cross-sectional views of the filter unit according to the first embodiment.
Figure 6B:
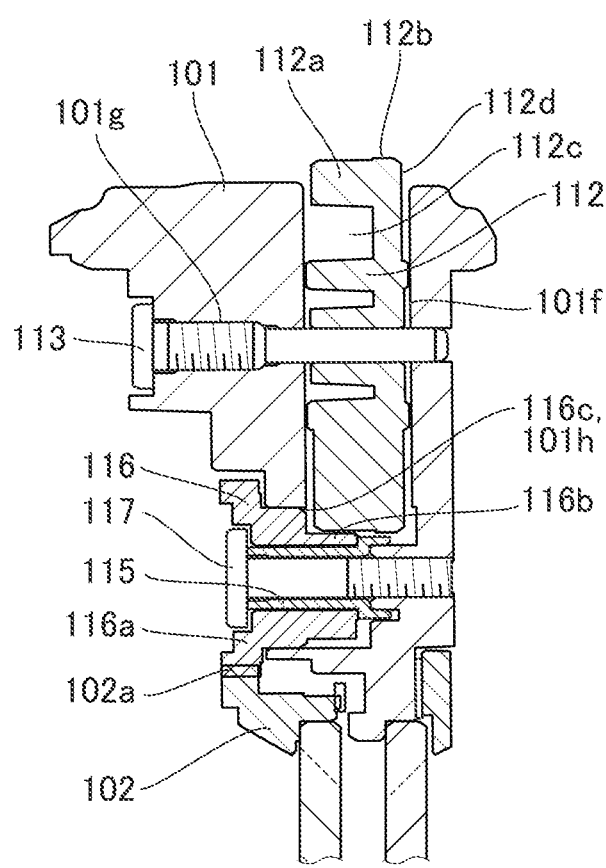

FIG. 5 is a view of the filter unit 100 according to the first embodiment as viewed from the object side. FIGS. 6A and 6B are cross-sectional views of the filter unit 100 according to the first embodiment. FIG. 6A is a cross-sectional view taken along line 5A-5A of FIG. 5. FIG. 6B is a cross-sectional view taken along line 5B-5B of FIG. 5. First, the outer shape of the filter unit 100 will be described. The filter holder 101 has a first outer shape portion 101b (a third portion) with a first outer diameter and a second outer shape portion 101c (a fourth portion) with a second outer diameter smaller than the first outer diameter. Similarly, the decorative plate 106 has a smaller outer shape than the first outer shape portion as a second outer shape portion. The second inner diameter of the second inner surface portion 12c of FIG. 3 is smaller than the first outer diameter of the first outer shape portion 101b. Further, a flange 101e is formed on the filter holder 101.

In this connection, the first outer diameter is smaller than the first inner diameter and the second outer diameter is smaller than the second inner diameter. Here, the outer diameter means a distance from an optical axis to the outer surface in a plane vertical to the optical axis.

In this embodiment, it is so configured that the first outer shape portion 101b has a first outer diameter and the second outer shape portion 101c has a second outer diameter at least in the first cross-section plane, which is vertical to the optical axis.

In addition, the filter holder 101 and the filter frame 102 may be configured as one body.

Further, all part of the outer surface of the first outer shape portion 101b does not need to have the same outer diameter and all part of the outer surface of the second outer shape portion 101c does not need to have the same outer diameter.

Figure 7:
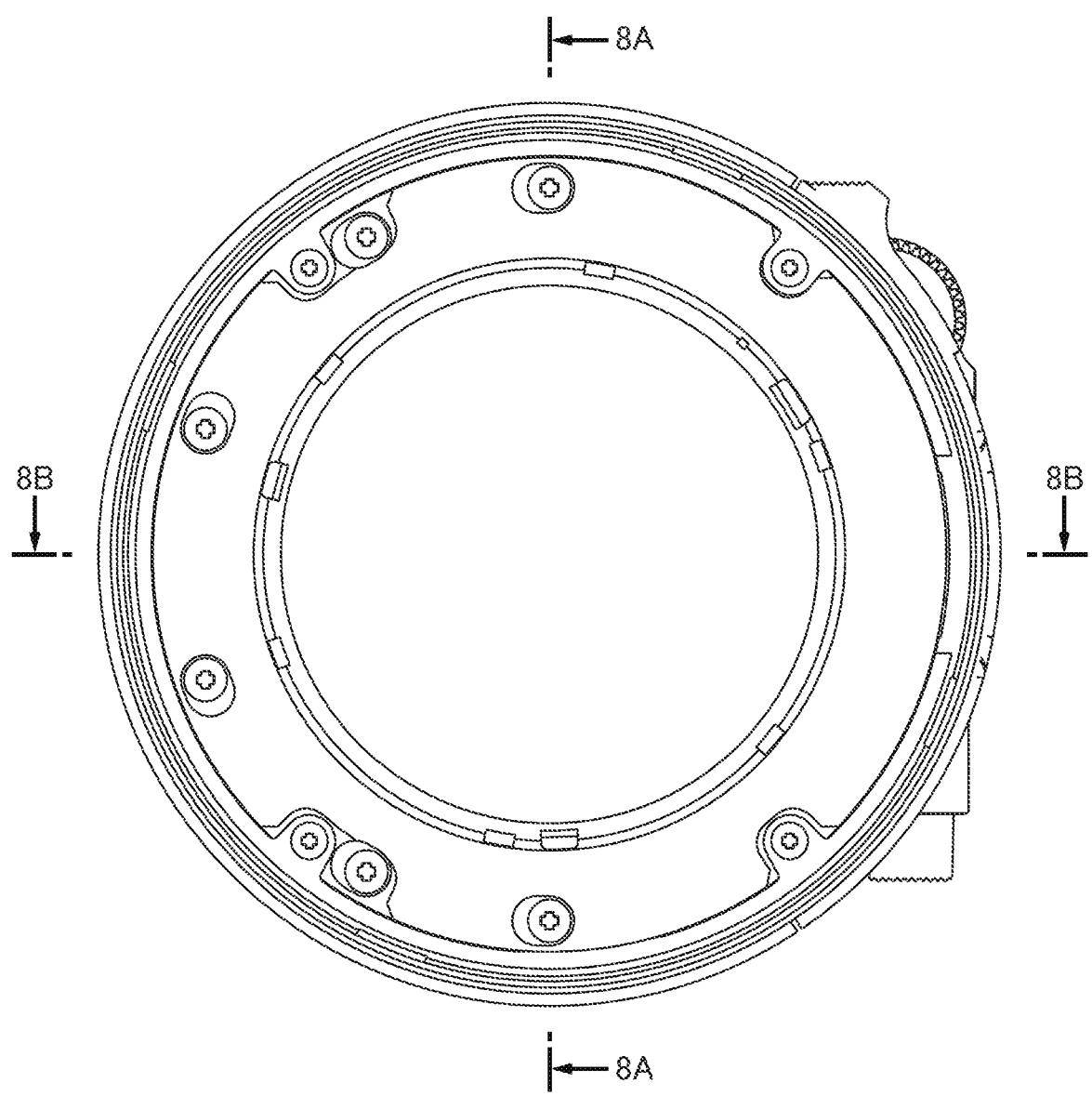
FIG. 7 is a view of a part of the lens barrel with the filter unit inserted as viewed from the object side.
Figure 8A:
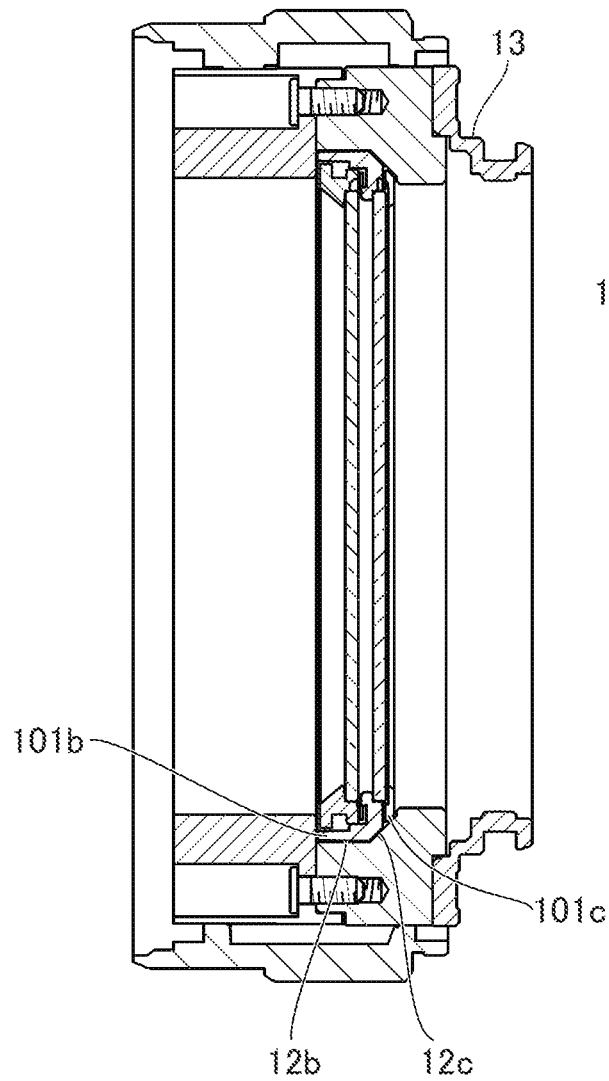
FIGS. 8A and 8B are cross-sectional views of parts of the lens barrel with the filter unit inserted.
Figure 8B:
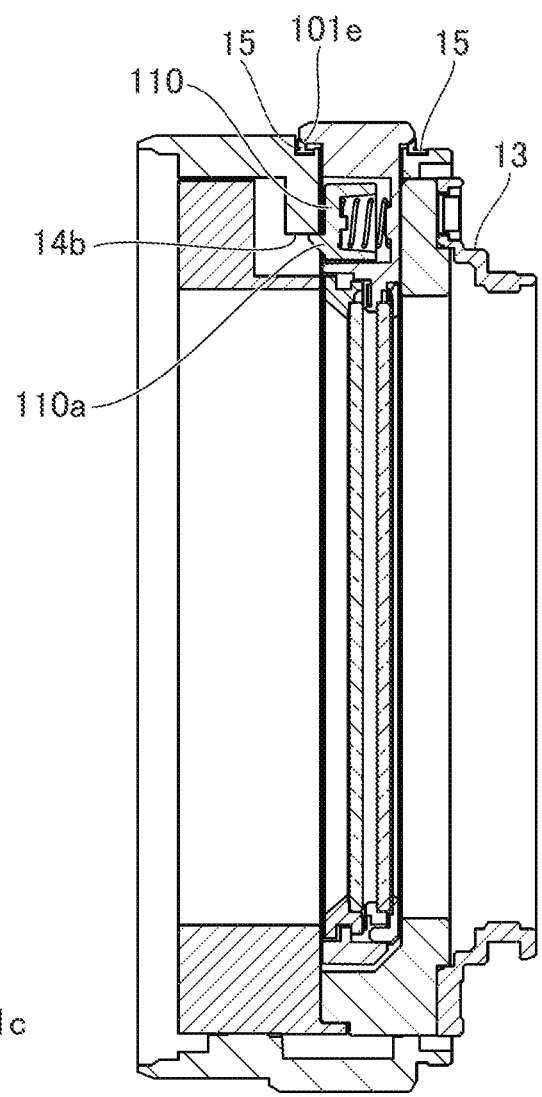

Here, insertion and removal of the filter unit 100 into and from the lens barrel 10 according to the first embodiment will be described with reference to FIGS. 7 and 8. FIG. 7 is a view of a part of the lens barrel 10 with the filter unit 100 inserted thereinto as viewed from the object side. FIGS. 8A and 8B are cross-sectional views of parts of the lens barrel 10 with the filter unit 100 inserted. FIG. 8A is a cross-sectional view taken along line 8A-8A of FIG. 7. FIG. 8B is a cross-sectional view taken along line 8B-8B of FIG. 7.

First, insertion of the filter unit 100 will be described. As shown in FIG. 8, the first outer shape portion 101b and the inner surface portions 12b, and the second outer shape portion 101c and the inner surface portions 12c respectively have corresponding shapes fitted to each other and act as guides. When the filter unit 100 is inserted in a correct direction (the first direction), an outer surface (first surface) of the first filter 103 (first optical element) faces toward an object direction (first direction). In this case, the first outer shape portion 101b does not contact with the inner portion 12c and faces with the inner surface portion 12b so that the filter unit 100 can be fully and smoothly mounted to the opening portion 12a of the lens barrel 10. That is, in this case, the filter unit 011 can be correctly mounted to the optical apparatus (the lens apparatus).

However, in a reverse direction, in which the outer surface (first surface) of the first filter 103 (first optical element) faces toward an image plane direction (second direction) opposite to the first direction, the first outer shape portion 101b contacts with the second inner surface portion 12c since the inner diameter of the second inner surface portion 12c is smaller than the outer diameter of the first outer shape portion 101b. That is, in this case, the filter unit 011 cannot be correctly mounted to the optical apparatus (the lens apparatus).

This prevents the photographer from mounting the filter unit 100 to the lens barrel 10 in a case where the filter unit 100 is inserted into the opening portion 12a in the reverse direction. In the first embodiment, the second outer shape portion 101c is a tapered surface with a second outer diameter smaller than the first outer diameter as an example, but the present invention is not limited to this configuration. The second outer shape portion 101c only needs to have a second outer diameter smaller than the first outer diameter and may have, for example, a stepped shape or the tapered surface thereof may be curved. The second inner surface portion 12c may have a shape corresponding to and fitted to the second outer shape portion 101c.

In addition, as mentioned before, edges of narrow sides of the opening portion 12a are configured to be linear as partly shown in FIG. 1, so that the filter unit 100 (an optical element unit) can be partly inserted into the opening portion without damaging the opening portion 12a even with the first surface of the optical element unit facing toward the image plane since, at this time, a distance between the second outer shape portion 101c (the fourth portion) and the opening portion is greater than a distance between the first outer shape portion 101b (the third portion) and the opening portion in a direction vertical to a normal line direction of the first surface of the first optical element.

In addition, since the lens barrel 10 is used by mounting the mount 13 on a camera body (not shown), stress tends to be concentrated at corner portions on the image plane side. The lens barrel 10 of the first embodiment can be enhanced in strength since the second inner surface portion 12c with a smaller inner diameter is formed closer to the image plane, that is, closer to the mount 13, than the first inner surface portion 12b is. The second inner surface portion 12c serves to increase the strength of the lens barrel 10 in addition to achieving a structure preventing reverse insertion of the filter unit 100 described above.

Returning to FIG. 4, the configuration of the release button 107 will be described. The release button 107 is attached such that it can advance and retract into and from a hole 101i formed in the filter holder 101. The retaining ring 109 is provided as a stopper to prevent removal from the hole 101i and is attached to a shaft portion of the lock piece 110. The release button 107 is always biased to a locked position by the release spring 108. A lock piece accommodating portion 101d (see FIG. 6) is formed in a substantially central portion of the filter holder 101.

The lock piece 110 is attached to the lock piece accommodating portion 101d such that it can advance and retract in the optical axis direction. A sloped portion 110b is formed on the lock piece 110 to prevent the lock piece 110 from falling off, by coming into contact with a sloped portion formed at the tip of the release button 107. The lock piece 110 is biased by the lock spring 111 in a direction away from the filter holder 101. On the lock piece 110, a lock piece claw 110a is formed to protrude in the optical axis direction.

The lock piece claw 110a of the lock piece 110 has a tapered surface as shown in FIG. 6A and is pushed against a side surface of the opening portion 14a of the outer ring 14 and pushed into the inside of the lock piece accommodating portion 101d when the filter unit 100 is inserted as shown in FIG. 1. As a side surface of the lock piece claw 110a engages with the lock piece end 14b in FIG. 3B, the filter unit 100 is mounted on the lens barrel 10 and locked as shown in FIG. 8B. Since the seal member 15 in FIG. 3B and the flange 101e in FIG. 6A are in close contact with each other in the mounted and locked state, it is possible to prevent the entry of water from outside.

To remove the filter unit 100 from the lens barrel 10, the release button 107 is pushed toward the filter holder 101 (upward in FIG. 5). When the release button 107 is pressed, the sloped portion formed at the tip of the release button 107 pushes the sloped portion 110b formed on the lock piece 110 and the lock piece 110 moves toward the filter holder 101. Thus, the engagement between the lock piece claw 110a and the lock piece end 14b is released and the filter unit 100 can be removed from the lens barrel 10.

Next, the first filter 103 and the second filter 105 will be described with reference to FIG. 6A. In the first embodiment, each of the first filter 103 and the second filter 105 is, for example, glass (an optical filter) having a polarization function that can transmit predetermined polarized light but may be an optical element such as a lens. Therefore, the rotation of the first filter 103 relative to the second filter 105 changes the amount of light passing through the first filter 103 and the second filter 105.

The first filter 103 is bonded to and integrated with the filter frame 102 by a known means such as adhesion and is held by the filter frame 102. A bayonet claw 102b is formed on the outer periphery of the filter frame 102 and a bayonet claw 101a is formed on the inner periphery of the filter holder 101, such that the filter frame 102 is rotatably held relative to the filter holder 101. A plate spring 104 is disposed between the filter frame 102 and the filter holder 101, such that the filter frame 102 is biased in a direction away from the filter holder 101. Thereby, it is possible to prevent a filter frame gear 102a which will be described later from tilting to the filter holder 101 and thus to provide a smooth operation feeling.

In addition, the first filter 103 and the filter holder 101 are configured to be in direct contact with each other when pressure is applied to the first filter 103 from outside and the plate spring 104 is compressed. This can improve the adhesion reliability of the first filter 103 and the filter frame 102.

The second filter 105 is integrally bonded to the filter holder 101 by a known means such as adhesion. A decorative plate 106 is disposed on the filter holder 101 to conceal adhesion marks of the adhesive described above. The filter holder 101 and the decorative plate 106 may be integrated by a known method such as via a double-sided tape or adhesion.

Next, a configuration of a gear portion 112a of the operating dial 112 will be described with reference to FIG. 6B. The filter holder 101 has a recess portion 101f which can accommodate the operating dial 112 and can separate the inside from outside. A shaft hole 101g is formed through surfaces on the object side and the image plane side of the recess portion 101f and the operating dial shaft 113 penetrates through the shaft hole 101g. The operating dial 112 is rotatably supported on the operating dial shaft 113. On the outer periphery of the operating dial 112, the gear portion 112a as a fourth transmission portion is formed and a flange 112b with a diameter greater than that of the tooth tip circle (circumscribed circle) of the gear portion 112a is formed closer to the image plane than the gear portion 112a is.

That is, the diameter of the flange is greater than that of a circumscribed circle of the gear portion 112a (the fourth transmission portion) when viewed in a normal line direction of the first surface of the first optical element.

In addition, the gear portion 112a (the fourth transmission portion) is formed ahead of the flange in the first direction when the optical element unit is facing toward the first direction.

The module value of the gear portion 112a is preferably 0.3 or more and optimally 0.3.

The gear portion 112a of the operating dial 112 doubles as a knurled shape which is a finger hook of the operating dial. Since the gear portion 112a doubles as a knurled shape which is the finger hook, it is not necessary to separately form a knurled shape for the finger hook and it is possible to achieve downsizing. Further, the flange 112b with a diameter greater than that of the gear portion 112a is formed on the operating dial 112. Therefore, even if the filter unit 100 falls to the ground or the like and falls off the operating dial 112, the flange 112b can first touch the ground to protect the gear portion 112a.

The filter frame gear 102a as a first transmission portion is formed on the outer periphery of the filter frame 102. The filter frame gear 102a transmits an external driving force to the first filter 103 to rotate the first filter 103. The filter frame gear 102a is disposed at a position overlapping the second outer shape portion 101c when viewed in the optical axis direction. In addition, the filter frame gear 102a is disposed at a position overlapping the first outer shape portion 101b (the third portion) and not overlapping the second outer shape portion 101c (the fourth portion) in the optical axis direction when viewed in a direction orthogonal to the optical axis.

Here, the optical axis direction of the filter unit 100 corresponds to a normal line direction at a center of the first surface of the first filter 103 (the first optical element). In this connection, the filter frame gear 102a (the first transmission portion) is disposed ahead of the first filter 103 (the first optical element) in the first direction, when the optical element unit is facing toward the first direction.

The second filter 105 (the second optical element) is disposed at a position not overlapping the first outer shape portion 101b (the third portion) and overlapping the second outer shape portion 101c (the fourth portion) in a normal line direction of the first surface of the first optical element, and the first optical element is disposed ahead of the second optical element in the first direction when the optical element unit is facing toward the first direction.

Since the filter frame gear 102a is formed on the outer periphery of the filter frame 102, the outer diameter of the filter frame 102 is increased. However, with such a configuration, the filter unit 100 and the filter holder 101 can be downsized. The module value of the filter frame gear 102a is preferably 0.2 or more and optimally 0.2. Further, it is preferable that the module value of the filter frame gear 102a be smaller than the module value of the gear portion 112a.

By making the module value of the gear portion 112a greater than the module value of the filter frame gear 102a, the size per tooth of the gear portion 112a is made greater than that of the filter frame gear 102a, such that it is possible to provide the photographer with comfortable operability when he or she operates the operating dial 112. Further, since the module value of the filter frame gear 102a is smaller than the module value of the gear portion 112a, the filter frame 102 can be downsized by reducing the size per tooth of the filter frame gear 102a.

The connection gear 116 is attached with a gap therebetween in a direction orthogonal to the optical axis by a connection gear stop screw 117 via a spacer 115. The spacer 115 is disposed at an inner diameter portion of the connection gear 116 to restrict the position of the connection gear 116 in the optical axis direction. The connection gear 116 has a fitting portion 116c between a gear portion 116a and a gear portion 116b, which will be described later, in the optical axis direction.

The outer periphery of the fitting portion 116c is fitted into a fitting hole 101h formed in the filter holder 101. The fitting hole 101h is formed in a side surface of the recess portion 101f on the object side. Since the fitting portion 116c is fitted into the fitting hole 101h, it is possible to prevent water from entering the inside of the filter unit 100 and the lens barrel 10 even if water enters the recess portion 101f.

The fitting hole 101h is disposed ahead of the recess portion 101f in the first direction when the optical element unit is facing toward the first direction.

In addition, the spacer 115 is attached with a gap therebetween and thus the spacer 115 serves to complicate the path of water entry and it is possible to further prevent the entry of water by capillary action. Furthermore, if a known water repellent agent is applied to the connection gear 116, the drip-proof effect can further be enhanced.

The gear portion 116a as a second transmission portion and the gear portion 116b as a third transmission portion are formed on the outer periphery of the connection gear 116. That is, the gear portion 116a and the gear portion 116b interlock with each other and are coaxially rotatable. The gear portion 116a meshes with the filter frame gear 102a (fourth transmission portion), and the gear portion 116b meshes with the gear portion 112a. Therefore, by rotating the operating dial 112, the rotational force thereof is transmitted from the gear portion 112a to the gear portion 116b, and the connection gear 116 is rotated.

Thus, the rotational force of the connection gear 116 is transmitted from the gear portion 116a to the filter frame gear 102a, and the filter frame 102 is rotated. Since the fitting portion 116c is disposed between the gear portion 116a and the gear portion 116b in the optical axis direction as described above, it is possible to prevent water from entering through the teeth of the gear portion 116a and the gear portion 116b. The gear portion 116a meshes with the filter frame gear 102a, and the gear portion 116b meshes with the gear portion 112a. Therefore, when the module value of the filter frame gear 102a (first transmission portion) is smaller than the module value of the gear portion 112a (fourth transmission portion), the module value of the gear portion 116a (second transmission portion) is also made smaller than the module value of the gear portion 116b (third transmission portion).

The filter frame 102 is rotatably supported on the filter holder 101 by a bayonet method. A rotation restricting groove 112c is formed in the operating dial 112 to prevent the filter frame 102 from coming off the filter holder 101 in a specific phase, and the operating dial end shaft 114a or the operating dial end shaft 114b gets into the groove, thus restricting the rotation of the operating dial 112 by contact with the same. The restriction of the rotation is preferably set such that the rotation angle of the gear portion 112a is restricted to 75° or more. This is set at 90° in the first embodiment. By setting the angle to 90°, the range of change in the amount of light can be maximized. As described above, the rotation of the operating dial 112 is restricted by the rotation restricting groove 112c formed in the operating dial 112 and the rotation restricting ends are disposed directly on the operating dial 112, thus increasing static pressure at the rotation restricting ends.

Figure 9:
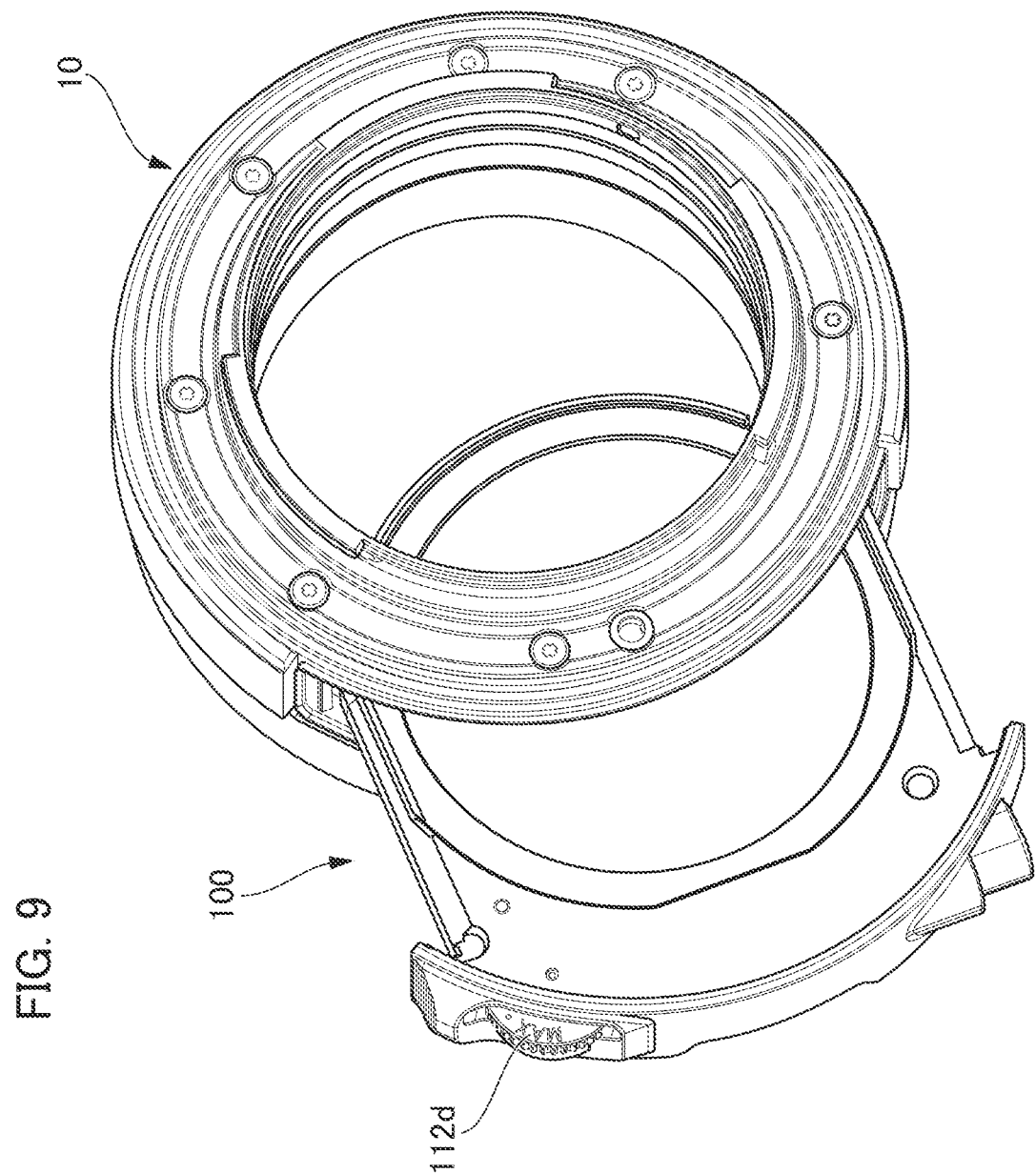
FIG. 9 is a view showing an example of an operation indicating portion of an operating dial.

An operation indicating portion 112d is formed on a side surface on the image plane side of the flange 112b of the operating dial 112. FIG. 9 is a perspective view showing an example of the operation indicating portion 112d of the operating dial 112 as viewed from the image plane side. The change rate of the amount of light or the rotation restricting ends described above can be indicated on the operation indicating portion 112d. In the drawing, as an example, letters "MAX" are printed as information indicating a change in the amount of light. In a state in which the letters "MAX" are visible, the amount of light passing through the first filter 103 and the second filter 105 is the lowest. When the filter unit 100 is inserted in a correct direction, the operation indicating portion 112d always faces toward the image plane, such that the photographer can easily check the operation indicating portion 112d. That is, the indication function of the operation indicating portion 112d can be appropriately provided.

Second Embodiment

Figure 10:
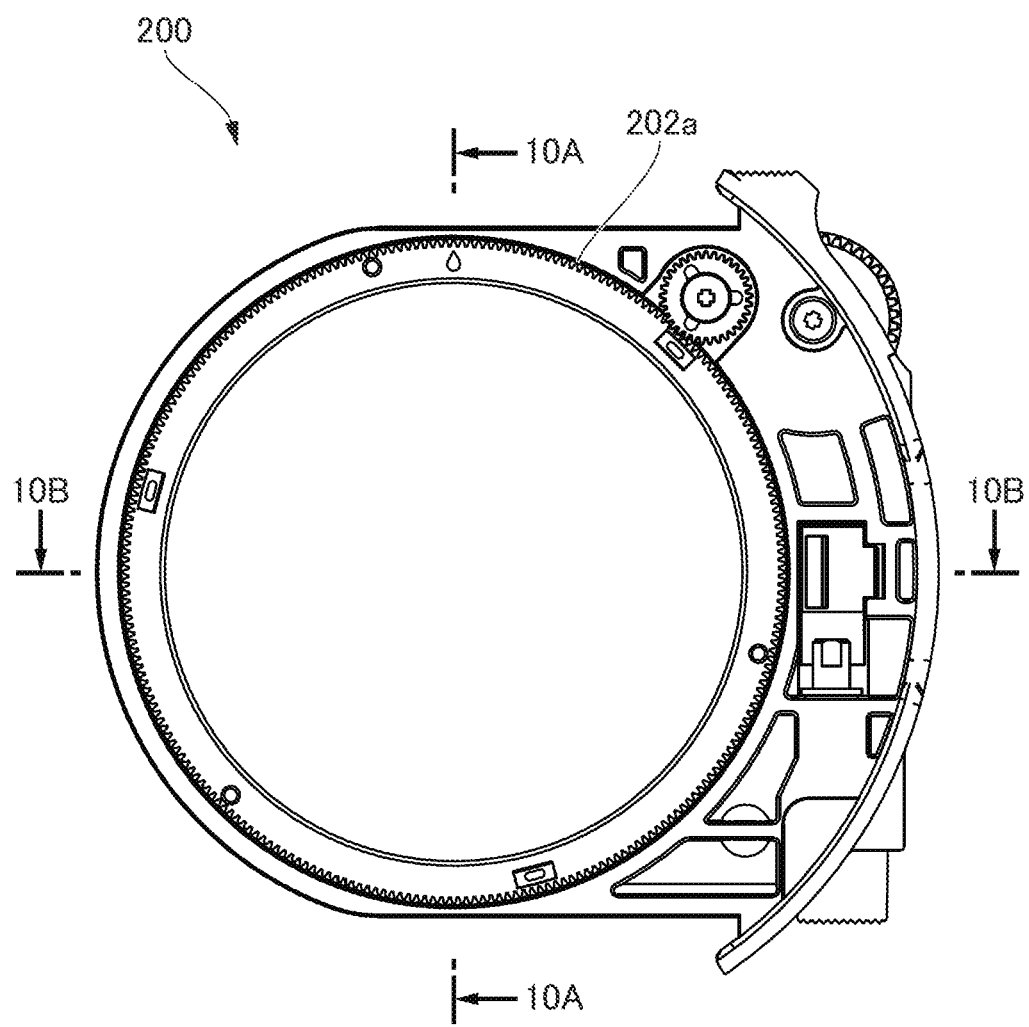
FIG. 10 is a view of a filter unit according to a second embodiment as viewed from the object side.

Hereinafter, an optical apparatus according to a second embodiment of the present invention will be described with reference to FIGS. 10 and 11. In the second embodiment, only a filter unit 200 which is different from that of the first embodiment will be described, and the same reference numerals are given to the same other parts and descriptions thereof will be omitted.

Figure 11A:
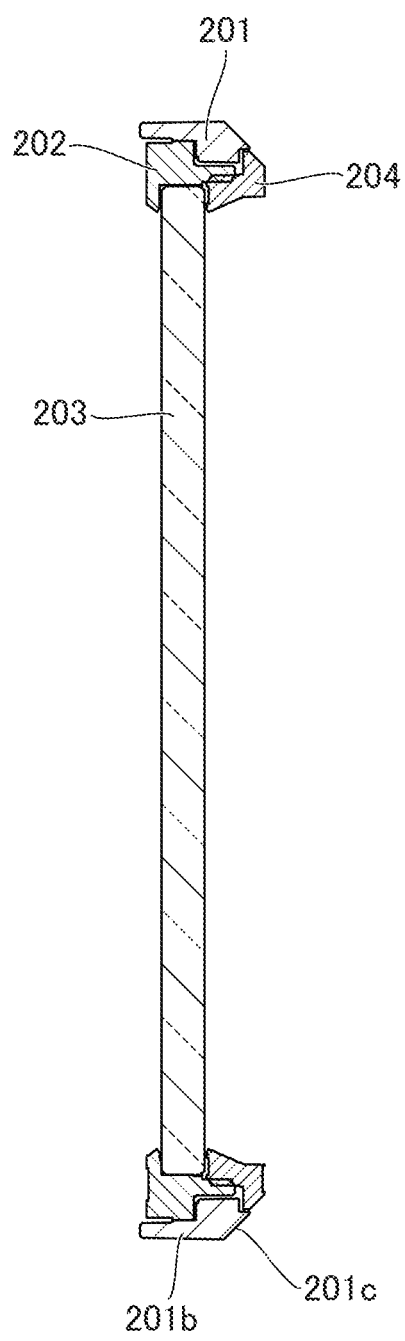
FIGS. 11A and 11B are cross-sectional views of a filter unit according to the second embodiment.
Figure 11B:
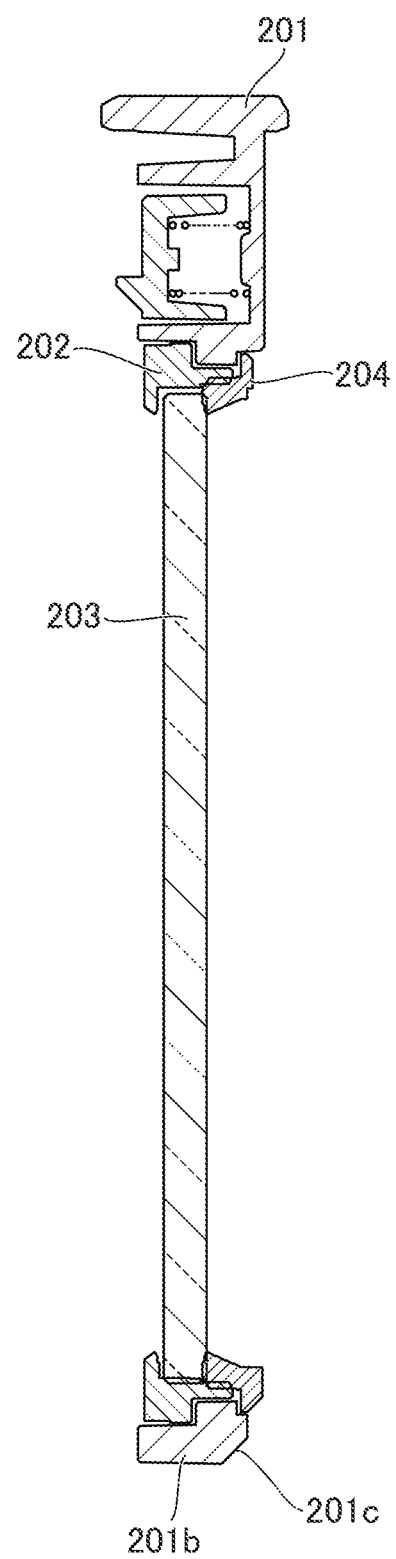

A configuration of the filter unit 200 according to the second embodiment will be described with reference to FIGS. 10 and 11. FIG. 10 is a view of the filter unit 200 according to the second embodiment as viewed from the object side. FIGS. 11A and 11B are cross-sectional views of the filter unit 200 according to the second embodiment. FIG. 11A is a cross-sectional view taken along line 10A-10A of FIG. 10. FIG. 11B is a cross-sectional view taken along line 10B-10B of FIG. 10. The filter unit 200 includes a filter holder 201, a filter frame 202, a first optical element 203, a pressure ring 204, a first outer shape portion 201b, and a second outer shape portion 201c.

The first optical element 203 is glass having polarization and can be rotated to change the polarization direction of a light beam. The first optical element 203 is accommodated in the filter frame 202 and held by the pressure ring 204. The filter frame 202 and the pressure ring 204 have a gap therebetween into which the filter holder 201 is inserted such that they are rotatably held by the filter holder 201. The first outer shape portion 201b with a first outer diameter and the second outer shape portion 201c with a second outer diameter smaller than the first outer diameter are formed on the filter holder 201. Similarly, the pressure ring 204 has a shape with a second outer diameter smaller than the first outer diameter as a second outer shape portion. The second inner surface portion 12c of FIG. 3 has a smaller outer shape than the first outer shape portion 201b. The module value of a filter frame gear 202a is preferably 0.2 or more and optimally 0.2. Further, it is preferable that the module value of the filter frame gear 202a be smaller than the module value of the gear portion 112a.

Since the filter frame gear 202a is formed on the outer periphery of the filter frame 202, the outer diameter of the filter frame 202 is made greater. The filter frame gear 202a having a greater outer diameter is disposed at a position overlapping the second outer shape portion 201c in the optical axis direction when viewed in the optical axis direction and not overlapping the second outer shape portion 201c in the optical axis direction when viewed in a direction orthogonal to the optical axis, thereby achieving downsizing of the filter holder 201. Further, similar to the first embodiment, the first optical element 203 can be inserted in a correct direction because it cannot be inserted into or removed from the opening of the lens barrel 10 in a reverse direction. That is, it is always possible to provide an appropriate polarization effect.

Since the module value of the filter frame gear 202a is smaller than the module value of the gear portion 112a, the filter frame 202 can be downsized by reducing the size per tooth of the filter frame gear 202a.

(Camera System)

Figure 12:
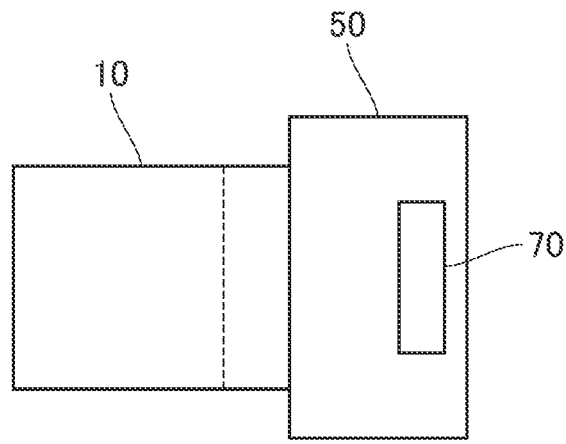
FIG. 12 is a view showing an example of a camera system.

FIG. 12 is a view illustrating an example of a camera system. The camera system includes the lens barrel 10 described above and a camera body 50 on which the lens barrel 10 is mounted. The camera body 50 has an image sensor 70 that receives light from the lens barrel 10 and functions as an optical apparatus (an image pickup apparatus). The image sensor 70 is a CCD, a CMOS image sensor, or the like. The filter unit of the above embodiments can also be applied to this camera system. In this connection, an optical imaging system may be disposed within the camera body 50 or the lens barrel 10.

(Adapter)

Figure 13:
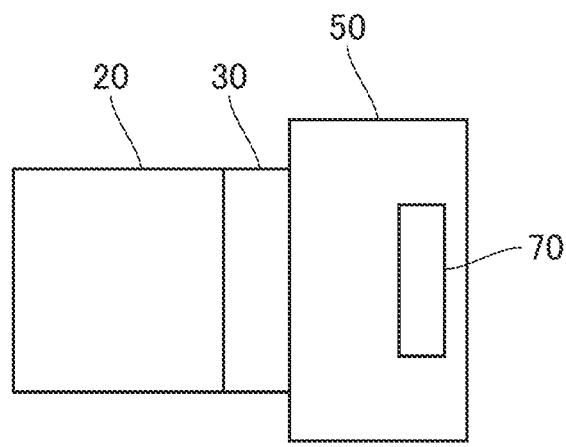
FIG. 13 is a view showing an example of an adapter.

FIG. 13 is a view showing an example of an adapter. The filter unit of the above embodiments may be insertable into and removable from the adapter 30 that connects a lens barrel 20 holding an imaging optical system and the camera body 50 holding the image sensor 70, which receives light through the lens barrel 20. Here, the camera body 50 (image pick-up apparatus), the lens barrel 20 and the adapter forms an imaging system and the filter unit can be insertable into the imaging system.

Figure 14:
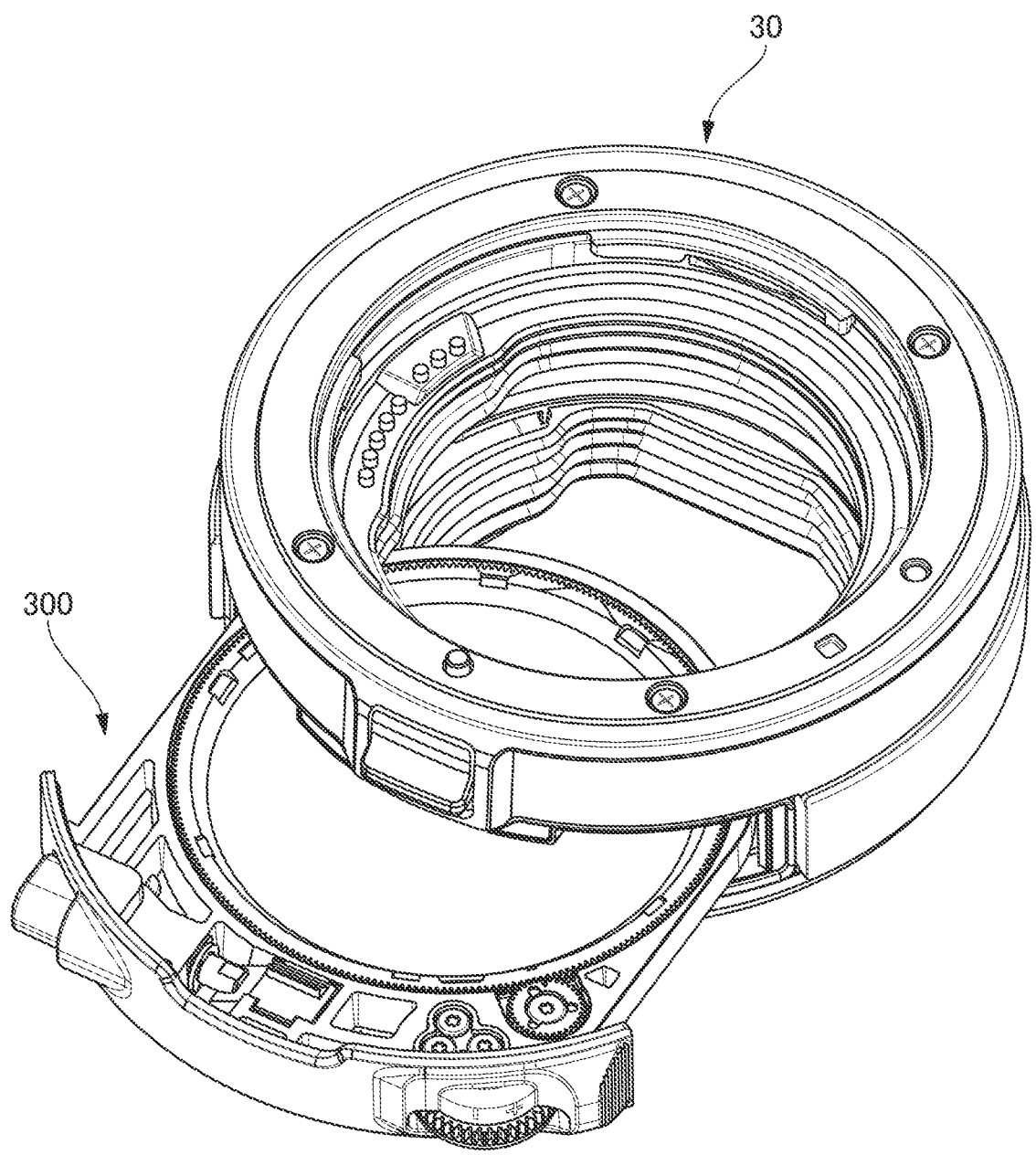
FIG. 14 is a view showing an adapter and a filter unit.

FIG. 14 shows the adapter 30 and the filter unit 300. The adapter 30 can be mounted between the lens barrel 20 and the camera body 50. The lens barrel 20 has a mounting structure which cannot be mounted directly on the camera body 50 and thus can be mounted on the camera body 50 by interposing the adapter 30 therebetween. The lens barrel 10 has a mounting structure which can be mounted directly on the camera body 50.

Modified Embodiment

Next, a modified embodiment will be explained. In the previous embodiment, the second outer shape portion 101c and 201c are tapered surfaces, and the second inner surface portion 12c is correspondingly a tapered surface.

That is, the second inner surface portion 12c (the second portion) includes an inclined surface with respect to the first inner surface portion 12b (the first portion) when viewed in a direction along which the optical element unit is inserted into the opening portion.

However, the second inner surface portion 12c does not need to be the tapered surface. For example, the second inner surface portion 12c may be an extended surface of the first inner surface portion and may include a protrusion.

That is, the second portion may include a protrusion with respect to the first portion when viewed in a direction along which the optical element unit is inserted into the opening portion.

In addition, corresponding to the above, the first outer shape portion 101b and 201b may have only one outer diameter without having the second outer shape portion 101c and 201c. In other word, the first outer shape portion 101b and the second outer shape portion 101c may be flat in FIG. 6A, and the first outer shape portion 201b and the second outer shape portion 201c may be flat in FIG. 11A, although they may have any uneven surfaces.

In the above embodiment, when the filter unit 100 or 200 is inserted into the opening portion 14a with a first surface facing toward the image plane direction, at least a part of the first outer shape portion 101b or 201b contacts with the second inner surface portion 12c, such as the protrusion, so that the optical element cannot be fully inserted into the opening portion.

In this connection, although in the above embodiments, the optical element includes an exemplarily a polarized filter, which can transmit a polarized light in a certain direction, the optical element is not limited to that. For example, the optical element may include a bandpass filter that transmits a light of a certain wavelength band, or an optical lens if necessary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-165240 filed on Sep. 4, 2018 and Japanese Patent Application No. 2019-145192 filed on Aug. 7, 2019, which are hereby incorporated by reference herein in its entirety.

What is claimed is:

1. A filter unit configured to be insertable into and removable from an opening portion provided in an adaptor, wherein the adaptor is detachable with a lens apparatus and an image pickup apparatus, the filter unit comprising:
   a first filter;
   a holding member configured to hold the first filter; and
   a lock piece having a lock piece claw;
   wherein the opening portion has a first portion with a first inner diameter and a second portion with a second inner diameter smaller than the first inner diameter,
   wherein the holding member includes a third portion with a first outer diameter and a fourth portion with a second outer diameter smaller than the first outer diameter,
   wherein a fourth portion includes a tapered surface inclined to a normal line direction of a first surface of the first filter,
   wherein, in a case where the filter unit is inserted into the opening portion with the first surface facing toward a first side in an optical axis direction, the third portion faces the first portion, the fourth portion faces the second portion, and the lock piece claw engages with a lock piece end formed on a part of the opening portion facing the first portion in the optical axis direction, so that the filter unit is attached to the adaptor, and
   wherein, in a case where the filter unit is inserted into the opening portion with the first surface facing toward a second side opposite to the first side, the third portion contacts the second portion, so that the filter unit is not attached to the adaptor.

2. The filter unit according to claim 1, further comprising a lock spring biasing the lock piece in a direction away from the holding member.

3. The filter unit according to claim 1, wherein the holding member has a lock piece accommodating portion that accommodates the lock piece.

4. The filter unit according to claim 1, further comprising a release button for pressing the lock piece so that the engagement between the lock piece claw and the lock piece end is released.

5. The filter unit according to claim 4, wherein the release button releases the engagement by pressing the lock piece to move in a direction perpendicular to the normal line direction and a direction for inserting the filter unit.

6. The filter unit according to claim 4, wherein the lock piece has an inclined surface inclined to the optical axis direction and a direction of a movement of the release button.

7. The filter unit according to claim 6, wherein the release button releases the engagement by pressing the inclined surface of the lock piece.

8. The filter unit according to claim 4, wherein the holding member has a hole into which the release button advances.

9. The filter unit according to claim 8, further comprising a retaining ring as a stopper to prevent the release button from removing from the hole.

10. The filter unit according to claim 4, further comprising an operating dial for transmitting an external rotational power to the first filter, wherein the operating dial is disposed at an opposite side to the release button with respect to the lock piece.

11. The filter unit according to claim 1, wherein the holding member comprises:
   a first gear for transmitting an external driving force to the first filter;
   a connection gear that has a second gear that meshes with the first gear and a third gear interlocking with the second gear;
   a fourth gear that meshes with the third gear; and
   an operating dial for transmitting an external rotational power to the first filter;
   wherein the holding member has a fitting hole into which the connection gear is fitted and a recess portion which accommodates the operating dial.

12. The filter unit according to claim 11, wherein the first gear is disposed at the first side with respect to the first filter.

13. The filter unit according to claim 11, wherein, in a case where the first surface of the first filter faces toward the first side, the fitting hole is disposed at the first side with respect to the recess portion.

14. The filter unit according to claim 11, further comprising a spacer for restricting the position of the connection gear in the normal line direction.

15. The filter unit according to claim 11, wherein module values of the first gear and the second gear are smaller than those of the third gear and the fourth gear.

16. The filter unit according to claim 11, wherein the operating dial has a flange with a diameter greater than that of the circumscribed circle of the fourth gear when viewed in the normal line direction.

17. The filter unit according to claim 16, wherein, in a case where the first surface of the first filter faces toward the first side, the fourth gear is disposed at the first side with respect to the flange.

18. The filter unit according to claim 1, wherein the holding member comprises a first gear for transmitting an external driving force to the first filter, wherein the first gear is disposed at a position overlapping the third portion and not overlapping the tapered surface when viewed in a direction orthogonal to the normal line direction.

19. The filter unit according to claim 1, wherein the holding member comprises a filter holder disposed at the most outer side in a direction orthogonal to the normal line direction, wherein the filter holder includes the third portion and the fourth portion.

20. The filter unit according to claim 19, wherein the filter holder comprises a flange, wherein the lock piece claw is disposed at an inner side of the flange of the filter holder in the direction orthogonal to the normal line direction.

21. The filter unit according to claim 1, wherein in a case where the filter unit is attached to the adaptor, the fourth portion is disposed at a side toward the image pickup apparatus with respect to the third portion.

22. The filter unit according to claim 1, wherein the first filter is disposed at a position overlapping the third portion and not overlapping the tapered surface when viewed in a direction orthogonal to the normal line direction.

23. The filter unit according to claim 1, further comprising a second filter 105 disposed at a position overlapping the fourth portion and not overlapping the third portion when viewed in a direction orthogonal to the normal line direction.

24. The filter unit according to claim 23, wherein, in a case where the first surface faces toward the first side, the first filter is disposed at the first side with respect to the second filter.

25. The filter unit according to claim 23, wherein the first filter and the second filter 10 respectively transmit predetermined polarized light.

26. The filter unit according to claim 23, wherein light amount passing through the filter unit varies by relatively rotating the first filter and the second filter.

27. The filter unit according to claim 1, wherein the first outer diameter is smaller than the first inner diameter and the second outer diameter is smaller than the second inner diameter.

28. The filter unit according to claim 1, wherein a distance between the fourth portion and the opening portion in a direction orthogonal to the normal line direction is larger than that between the third portion and the opening portion.

29. The filter unit according to claim 1, wherein the second portion includes an inclined surface inclined to the normal line direction.

30. The filter unit according to claim 1, wherein the second portion includes a protruding portion protruding with respect to the first portion when viewed from a direction for inserting the filter unit.

31. The filter unit according to claim 1, wherein the second portion is disposed at a side toward the image pickup apparatus with respect to the first portion.

32. An adaptor detachable with a lens apparatus and an image pickup apparatus comprising:
an opening portion which a filter unit is insertable into and removable from, wherein the filter unit includes a first filter, a holding member configured to hold the first filter, and a lock piece having a lock piece claw;
wherein the opening portion has a first portion with a first inner diameter and a second portion with a second inner diameter smaller than the first inner diameter,
wherein the holding member includes a third portion with a first outer diameter and a fourth portion with a second outer diameter smaller than the first outer diameter,
wherein the fourth portion includes a tapered surface inclined to a normal line direction of a first surface of the first filter,
wherein, in a case where the filter unit is inserted into the opening portion with the first surface facing toward a first side in an optical axis direction, the third portion faces the first portion, the fourth portion faces the second portion, and the lock piece claw engages with a lock piece end formed on a part of the opening portion facing the first portion in the optical axis direction, so that the filter unit is attached to the adaptor, and
wherein, in a case where the filter unit is inserted into the opening portion with the first surface facing toward a second side opposite to the first side, the third portion contacts the second portion, so that the filter unit is not attached to the adaptor.

33. An optical apparatus comprising;
an adaptor detachable with a lens apparatus and an image pickup apparatus, wherein the adaptor has an opening portion including a first portion with a first inner diameter and a second portion with a second inner diameter smaller than the first inner diameter; and
a filter unit insertable into and removable from the opening portion; wherein the filter unit includes a first filter, a holding member configured to hold the first filter, and a lock piece having a lock piece claw,
wherein the holding member includes a third portion with a first outer diameter and a fourth portion with a second outer diameter smaller than the first outer diameter,
wherein the fourth portion includes a tapered surface inclined to a normal line direction of a first surface of the first filter,
wherein, in a case where the filter unit is inserted into the opening portion with the first surface facing toward a first side in an optical axis direction, the third portion faces the first portion, the fourth portion faces the second portion, and the lock piece claw engages with a lock piece end formed on a part of the opening portion facing the first portion in the optical axis direction, so that the filter unit is attached to the adaptor, and
wherein, in a case where the filter unit is inserted into the opening portion with the first surface facing toward a second side opposite to the first side, the third portion contacts the second portion, so that the filter unit is not attached to the adaptor.

* * * * *